United States Patent [19]
Johnson et al.

[11] Patent Number: 5,692,143
[45] Date of Patent: Nov. 25, 1997

[54] METHOD AND SYSTEM FOR RECALLING DESKTOP STATES IN A DATA PROCESSING SYSTEM

[75] Inventors: Sophia M. Johnson; William Jesse Johnson, both of Flower Mound; Marvin L. Williams, Arlington, all of Tex.

[73] Assignee: International Business Machines Corporation, Armonk, N.Y.

[21] Appl. No.: 366,531

[22] Filed: Dec. 30, 1994

[51] Int. Cl.⁶ ............................... G06F 3/14; G06F 9/44
[52] U.S. Cl. .................. 395/339; 395/333; 395/966; 395/653
[58] Field of Search ........................ 395/155, 160, 395/159, 157, 161, 700, 650, 339, 326, 340, 342, 333, 334, 966, 356, 676, 651, 653, 682

[56] References Cited

U.S. PATENT DOCUMENTS

| | | | |
|---|---|---|---|
| 4,755,808 | 7/1988 | Bullock et al. | 345/163 |
| 5,321,838 | 6/1994 | Hensley et al. | 395/966 X |
| 5,428,785 | 6/1995 | Morel et al. | 395/651 |
| 5,448,739 | 9/1995 | Jacobson | 395/348 X |
| 5,481,710 | 1/1996 | Keane et al. | 395/682 |
| 5,535,389 | 7/1996 | Elder et al. | 395/712 |

FOREIGN PATENT DOCUMENTS

0621528A1  10/1994  European Pat. Off. .

OTHER PUBLICATIONS

Research Disclosure, No. 315, Jul. 1, 1990, "Saving Contents of Interactive Development Screen".
Research Disclosure, No. 349, May 1, 1993, "Invisible Logical Desktop Views".
IBM Technical Disclosure Bulletin, vol. 36, No. 8, Aug. 1993, "Automatic Desktop Manipulation Based on Calendar Events".
IBM Technical Disclosure Bulletin, vol. 30, No. 1, Jun. 1987 "Method to Return to Previously Entered Commands".
IBM Technical Disclosure Bulletin, vol. 34, No. 10B, Mar. 1992 "Equivalent 'UNDO' Concept and Its Use".
IBM Technical Disclosure Bulletin, vol. 29, No. 11, Apr. 1987 "Method to Back Out a Sequence of List Search Operations".
IBM Technical Disclosure Bulletin, vol. 31, No. 8, Jan. 1989 "Dynamic Creation of Edit Statements to UNDO the Action of General–purpose...".
IBM Technical Disclosure Bulletin, vol. 30, No. 2, Jul. 1987 "Transaction Retry With Trace".
IBM Technical Disclosure Bulletin, vol. 29, No. 6, Nov. 1986 "UNDO of Desired Actions".
IBM Technical Disclosure Bulletin, vol. 34, No. 12, May 1992 "Keyboard String Record/Playback Naming for Dependent Workstations".
IBM Technical Disclosure Bulletin, vol. 33, No. 7, Dec. 1990 "OS/2 Thread Usage for Capturing/Replaying Presentation Manager Data".

(List continued on next page.)

Primary Examiner—Raymond J. Bayerl
Attorney, Agent, or Firm—Edward H. Duffield; Brian F. Russell; Andrew J. Dillon

[57] ABSTRACT

A method and system for recalling a previous desktop state of a data processing system, where a desktop state specifies a dependence hierarchy and visual arrangement of a number of graphical objects representative of operating system functions and data processing applications that are displayed within a display device of the data processing system. The system detects each occurrence of a desktop event which creates a new desktop state. In response to detecting an occurrence of a desktop event, the system records the new desktop state. In response to a particular user input, the system automatically returns the desktop to a selected state previous to the current desktop state by referencing the recorded desktop states, wherein all operating system functions and data processing applications available at the selected state are enabled.

13 Claims, 4 Drawing Sheets

OTHER PUBLICATIONS

IBM Technical Disclosure Bulletin, vol. 32, No. 5A, Oct. 1989 "Interrupt Driven Keystroke Capture and Playback".

IBM Technical Disclosure Bulletin, vol. 29, No. 7, Dec. 1986 "Keysave/Keyuse".

IBM Technical Disclosure Bulletin, vol. 28, No. 6, Nov. 1985 "Programmable Function Keys".

IBM Technical Disclosure Bulletin, vol. 28, No. 4, Sep. 1985 "Method to Provide Programmable Functions Keys".

IBM Technical Disclosure Bulletin, vol. 28, No. 4, Sep. 1985 "Method to Ensure Proper Insert/Replace Mode During Keystroke Programming".

IBM Technical Disclosure Bulletin, vol. 28, No. 4, Sep. 1985 "Method for Handling Maximum Keystrokes Captured During Keystroke Programming".

IBM Technical Disclosure Bulletin, vol. 28, No. 4, Sep. 1985 "Automatic Keystroke Playback with Error and Status Message Analysis".

IBM Technical Disclosure Bulletin, vol. 28, No. 4, Sep. 1985 "Keystroke Record and Playback Function During Emulation of Multiple System and Modes".

IBM Technical Disclosure Bulletin, vol. 28, No. 4, Sep. 1985 "Keystroke Record and Playback Arrangement with Pause and Resume Functions".

IBM Technical Disclosure Bulletin, vol. 26, No. 1, Jun. 1983 "Matching Keyboards and Saved Keystrokes".

IBM Technical Disclosure Bulletin, vol. 25, No. 12, May 1983 "Display and Print of Saved Keystrokes".

IBM Technical Disclosure Bulletin, vol. 25, No. 12, May 1983 "Delayed Single-Step Playback of Saved Keystrokes".

IBM Technical Disclosure Bulletin, vol. 25, No. 12, May 1983 "Temporary Suspension of Keystroke Save".

Legal Assistant Today, Mar./Apr. 1991, pp. 45–47 and 112–114 "Using WordPerfect as a General Law Practice System".

Database, Feb. 1990, pp. 84–86, Steve Cisler "Farallon Computing Extends The Meaning of Personal Computing".

Online, Jul. 1992, pp. 85–87, Erik Delfino "Digging Into DOS 5.0".

Systems Integration, Apr. 1992, Brian Livingston, "Speed Up Simple Tasks with Script Languages".

Computers in Accounting, Jan. 1992, pp. 37–39, "Saving Keystrokes With Doskey".

Financial and Accounting Systems, Summer 1991, pp. 29–34, David C. Yang, "The Added Control of Lotus Macros".

METHOD AND SYSTEM FOR RECALLING DESKTOP STATES IN A DATA PROCESSING SYSTEM

BACKGROUND OF THE INVENTION

1. Technical Field

The present invention relates in general to a method and system for improved data processing and in particular to a method and system for manipulating desktop objects displayed within the display device of a data processing system. Still more particularly, the present invention relates to a method and system for recalling previous desktop states while preserving all functions available within the resulting context.

2. Description of the Related Art

A Graphical User Interface (GUI) is a well-known technique of presenting information to a user of a data processing system in a graphical and intuitive manner. Typically, a user is presented with a number of desktop objects, such as data processing applications, system functions or data files, which the user may select utilizing a graphical pointing device or other input means, such as voice, keyboard, or touch screen. Once the user has selected a desktop object, the user may reposition the selected desktop object, also known as the focused object, within the display screen utilizing the familiar drag-and-drop technique. Alternately, if the focused object represents a software module, the user may invoke the execution of the software module by manipulating the focused object in a manner dependent upon the operating system environment.

Although a GUI provides an easily utilized interface to a data processing system, a GUI is often inefficient since a user may have to perform several manipulations of desktop objects to return to a previous desktop state. For example, after system power-on, a user may be presented with a desktop manager menu. By selecting items within the desktop manager menu a user may spawn a main menu containing a number of data processing applications or operating system functions. The user may then manipulate the graphical objects representing the applications or system functions to relocate them within the display or to spawn the applications or functions themselves. Thus, a user may, for example, double-click with a mouse on a first application icon to spawn application A. The user may then open a window X within application A and process data. Thereafter, the user may spawn application B while within window X and then close window X, thereby removing window X from the desktop. After several similar manipulations, the user may wish to return the desktop to the state in which window X of application A was open and active on the desktop.

Many data processing applications provide features that enable a user to retrace prior processing paths. On such feature, commonly referred to as "undo," enables a user to incrementally reverse processing steps performed within a data processing application. Conceptually, an undo function chronologically stores processing steps in a stack. Each invocation of the undo function returns the application to the immediately previous state, thereby enabling a user to navigate to any previous state for which dependent paths have not been destroyed. For example, a user manipulating graphical objects within a drawing application may return a graphical object to a previous location by invoking the application's undo function. However, undo functions are limited to a specific application and to contexts within that application. A desktop environment may require intermediate processing steps to return to a previous desktop state that may have been destroyed by subsequent manipulation of desktop objects. For example, in the desktop example described above, window X was destroyed (i.e., removed from the desktop) after the user branched to a dependent path by invoking application B.

A record/playback function or macro is a second type of feature commonly available in data processing systems which enables a user to automatically re-perform previously executed processing steps. To utilize a record/playback function, a user typically instructs the system to begin recording and then enters a series of inputs. After entering the desired inputs, the user instructs the system to stop recording. When the user desires to enter the recorded series of inputs to the system, the user instructs the system to replay the recorded inputs in lieu of the user reentering the inputs utilizing a keyboard or mouse, for example. Some data processing systems provide a similar feature which enables a user to program keys on the keyboard to represent a user-defined series of keystrokes. A record/playback function or programmed keys may be utilized within either an application or in a desktop operating environment. However, a record/playback feature and programmed keys do not enable a user to return to previous desktop state, but merely to repeat a pre-defined series of inputs. Furthermore, a user must often navigate to a starting point prior to playback. Consequently, in currently available data processing systems, to return to a previous desktop state a user must return the desktop to a state antecedent to the desired state and re-perform the desktop object manipulations required to arrive at the desired state.

Therefore, it would be desirable to provide a method and system for automatically recalling previous states of the desktop which preserve all functions available within the resulting context.

SUMMARY OF THE INVENTION

It is therefore one object of the present invention to provide an improved method and system for data processing.

It is another object of the present invention to provide an improved method and system for manipulating desktop objects displayed within the display device of a data processing system.

It is yet another object of the present invention to provide an improved method and system for recalling previous desktop states while preserving all functions available within the resulting context.

The foregoing objects are achieved as is now described. A method and system are disclosed for recalling a previous desktop state of a data processing system, where a desktop state specifies a dependence hierarchy and visual arrangement of a number of graphical objects representative of operating system functions and data processing applications that are displayed within a display device of the data processing system. The system of the present invention detects each occurrence of a desktop event which creates a new desktop state. In response to detecting an occurrence of a desktop event, the system records the new desktop state. In response to a particular user input, the system automatically returns the desktop to a selected state previous to the current desktop state by referencing the recorded desktop states, wherein all operating system functions and data processing applications available at the selected state are enabled.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
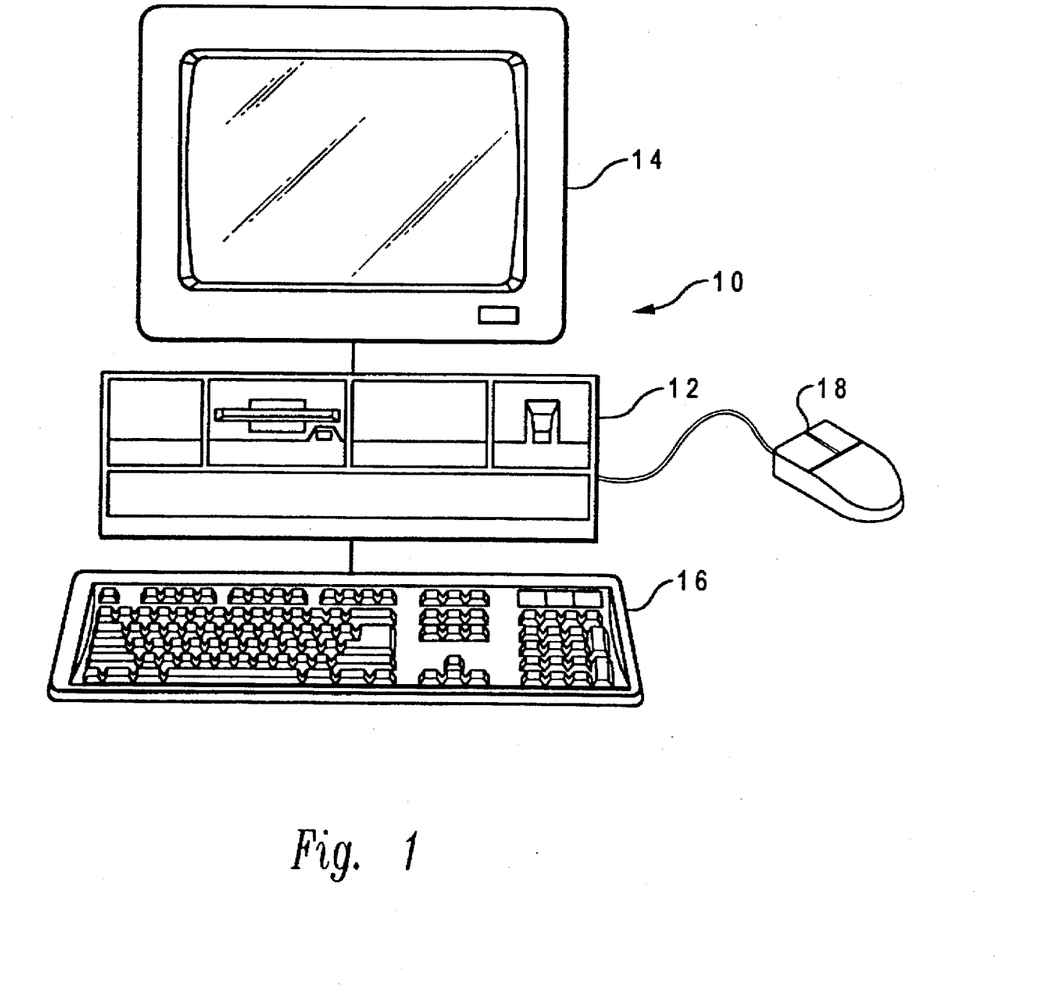
FIG. 1 illustrates a data processing system utilizing the method and system of the present invention.

With reference now to the figures and in particular with reference to FIG. 1, there is illustrated a data processing system employing the method and system of the present invention. As illustrated, data processing system 10 includes processing unit 12, display device 14, keyboard 16, and mouse 18. Typically, processing unit 12 includes a processor, a memory, and interface adaptors to interface peripheral devices such as keyboard 16 and mouse 18, as well as other peripherals such as a local printer (not illustrated).

As is well-known in the art, a user may input data to processing unit 12 utilizing keyboard 16 or mouse 18. Typically, input from keyboard 16 generates an interrupt that invokes the execution of a keyboard interrupt handler within the processor of processing unit 12. Input from mouse 18 is received by a peripheral device driver within processing unit 12. Like input from keyboard 16, each movement of mouse 18 generates an interrupt. The input signals from mouse 18, known in the art as mouse "droppings," are utilized by the GUI software executing within the processor of processing unit 12 to relocate or to select graphical objects displayed within display device 14. Both the keyboard and mouse input signals are accessible prior to processing by the processor through the use of software "hooks" which intercept the signals for use in other processes executing within the processor.

Processing unit 12 outputs data to a user in visual format via display device 14. According to the present invention, output data from processing unit 12 is presented to a user through a graphical user interface (GUI), which presents data to a user in a graphical and intuitive manner. As is well-known in the art, in systems utilizing a GUI, the operating system or GUI application displays a desktop to a user, which forms the root of a hierarchy of graphical objects displayed within the display device. On the desktop, the GUI may display a number of menu options and graphical objects, such as application icons, which form a second level within the hierarchy. Utilizing keyboard 16 or mouse 18, a user may invoke operating system functions or data processing applications via pull-down menu or icon selections. The invocation of an application or system function may in turn cause the GUI to display dependent graphical objects such as windows or decision boxes on the desktop, which form lower levels within the desktop object hierarchy.

Figure 2:
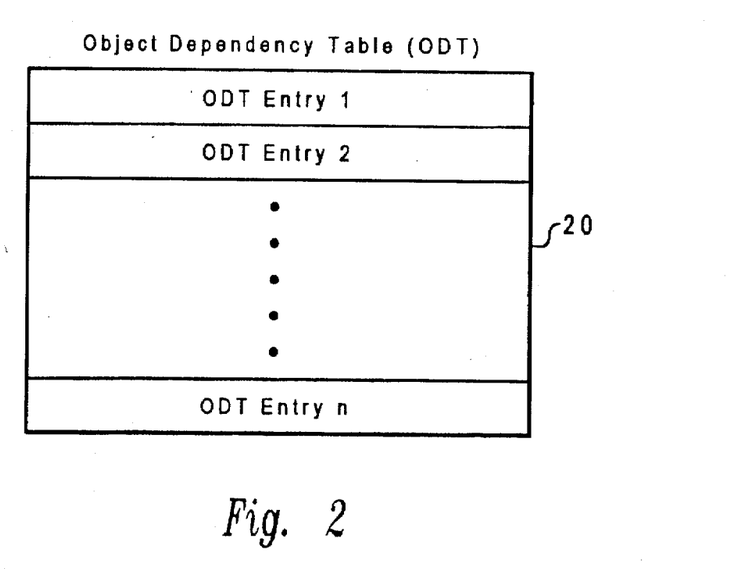
FIG. 2 depicts a preferred embodiment of a data structure utilized to store a hierarchy of desktop objects according to the present invention.

Referring now to FIG. 2, there is depicted a representation of a preferred embodiment of a data structure utilized by the present invention to store the hierarchy of desktop objects. Object dependency table (ODT) 20 comprises n entries, each corresponding to a distinct desktop state, wherein a desktop state includes the presence and position of desktop objects, as well as the identity of a focused object. As will be appreciated by those skilled in the art, n is variable and depends upon the current number of desktop objects as well as the manipulation history of the current desktop objects. Although the total number of entries within ODT 20 is potentially infinite, n is limited by design choice to a maximum number of states which a user desires to be able to recall. Should the number of entries reach the implemented limit, new entries are inserted into ODT 20 in place of the least recently inserted entries. As will be described with reference to FIG. 4, ODT 20 is arranged chronologically, with one entry inserted for each new desktop state.

Figure 3:
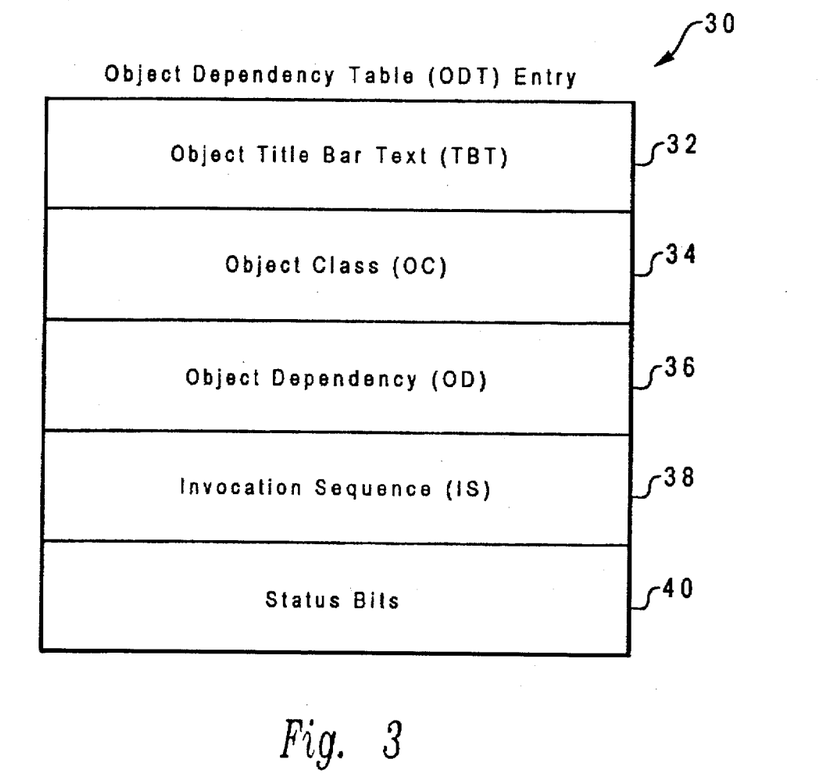
FIG. 3 illustrates a preferred embodiment of the structure of an entry within the data structure depicted in FIG. 2.

With reference now to FIG. 3, there is illustrated a representation of a preferred embodiment of an entry within ODT 20. The five fields 32–40 within entry 30 reflect a preferred embodiment of the present invention employed within a data processing system utilizing a OS/2 operating system and Presentation Manager GUI software. Those skilled in the art will appreciate that in data processing systems utilizing other operating systems and GUI software the structure of entry 30 may differ.

The first two fields of entry 30, object title bar text (TBT) 32 and object class (OC) 34, together comprise a unique object identifier in systems utilizing Presentation Manager in an OS/2 operating environment. In other embodiments, the unique object identifier stored in fields 32 and 34 may comprise a single unique key or combination of keys which specify a unique handle to an object within a data processing system. In the depicted embodiment, TBT 32 stores the text displayed on the title bar in conjunction with the focused object associated with entry 30. OC 34 specifies the Presentation Manager class to which the associated focused object belongs.

Next, object dependency (OD) field 36 indicates the relationship of the object associated with entry 30 to other objects within the graphical object hierarchy. If entry 30 is associated with the desktop itself, which in all cases is the root node of the desktop object hierarchy, OD 36 will indicate that the dependency is "none". If, however, the associated object is a first-level object (e.g., an icon or menu selection), OD 36 will indicate that the entry's associated object is dependent upon the "desktop" in the desktop object hierarchy. If entry 30 is associated with a new desktop object that is not a first-level object, OD 36 will identify the parent object by unique object identifier, which in the depicted embodiment is the TBT and OC of the parent object. Finally, as will be described further below, if entry 30 (corresponding to a new desktop state) is created by an input from keyboard 16, mouse 18, or other peripheral device that does not spawn a new desktop object, OD 36 will specify that entry 30 is a "continuation," indicating that the new desktop state is associated with the desktop object associated with the preceding desktop state.

The next field, invocation sequence (IS) 38, indicates how entry 30 was generated. If OD 36 specifies that the state is a "continuation," IS 38 will list the keystrokes, menu selections, button activations or other inputs tracked by the Presentation Manager utilized to generate entry 30. However, if OD 36 has a value other than "continuation", IS 38 will indicate the invocation which derived the graphical object associated with entry 30 from its associated parent object. As described above, the present invention detects the invocation sequence associated with a new state by utilizing software hooks which intercept and log all traceable programs, functions and system application programming interface (API) calls generated by a manipulation of a desktop object. Manipulations of a desktop object that create a new desktop state include input to the object, moving, sizing, minimizing, or maximizing the object, invoking or terminating the object, and any other manipulation that can be performed on an object.

Finally, entry 30 includes status bits 40. In the preferred embodiment discussed with reference to FIGS. 4 and 5, only a single status bit is utilized to indicate if entry 30 may be deleted from ODT 20. In other embodiments of the present invention, additional status bits may be utilized to enhance performance. For example, an additional status bit may be utilized to indicate if the associated object is currently focused. The addition of the focus bit would enable the process of the present invention to determine if an object is focused by examining a status bit rather than scanning Presentation Manger records. Similarly, in other embodiments status bits 40 may include a bit indicative of whether the associated object is active on the desktop (i.e., minimized or maximized on the desktop). Those skilled in the art will appreciate that additional status bits, although useful, increase the processing overhead required to maintain and utilize ODT 20.

Figure 4:
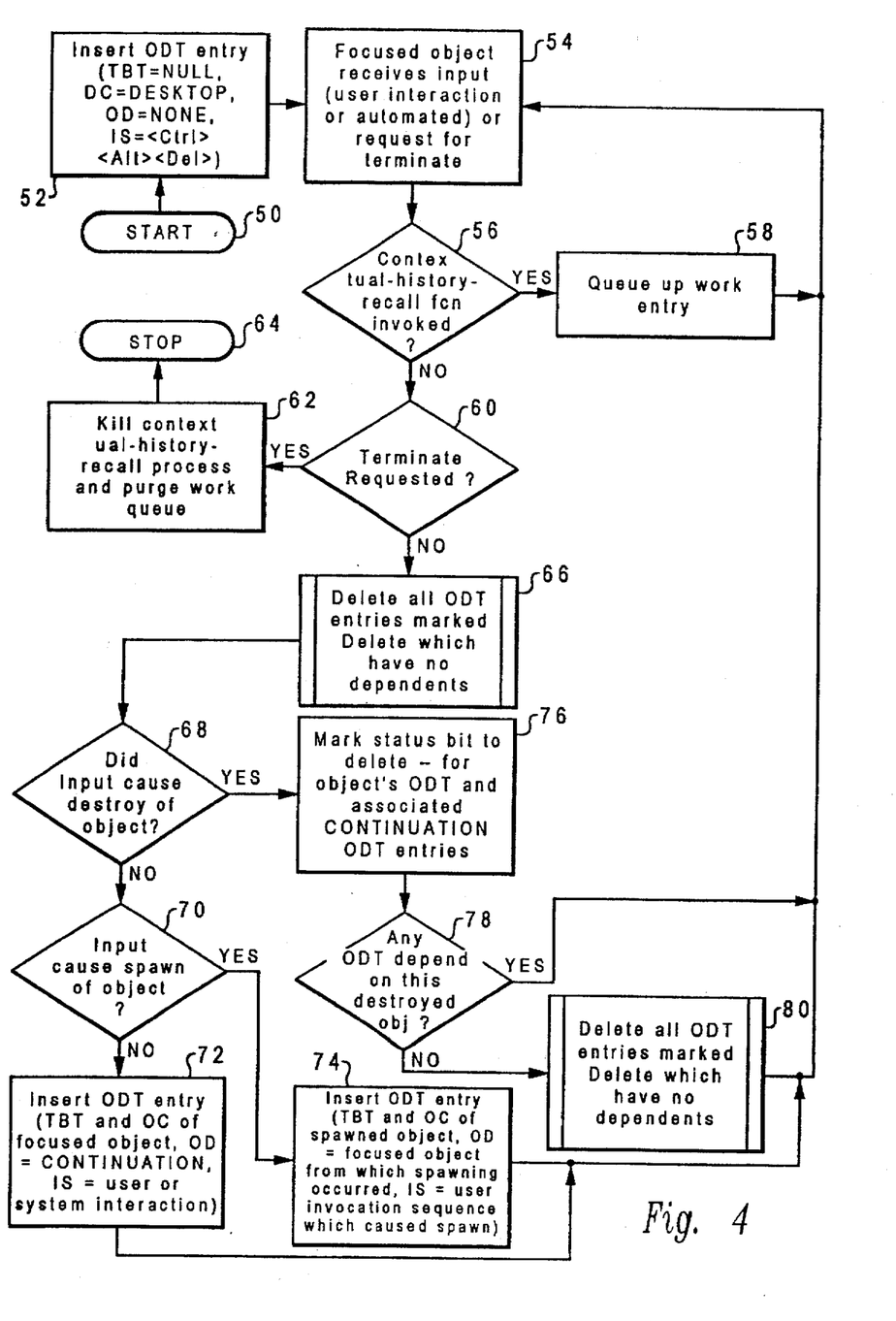
FIG. 4 depicts a flowchart of the process utilized by the present invention to build and maintain the data structure depicted in FIG. 2.

Referring now to FIG. 4, there is depicted a flowchart of the process utilized by the present invention to build and maintain object dependency table (ODT) 20. The depicted process may be implemented by suitable software executing within data processing system 10 and may be automatically started upon system startup. As illustrated, the process begins at block 50, and thereafter proceeds to block 52, which illustrates inserting a root entry into ODT 20 representing the desktop. The fields within the first entry indicate that the object is of the class "desktop", that the title bar text displayed is "null", that the desktop is not dependent upon other objects, and that the desktop is invoked by the keystroke sequence <Ctl> <Alt> <Del> (i.e., system reset). Next, the process proceeds to block 54, which depicts the process detecting input which manipulates the focused object of the current desktop state. The process of the present invention intercepts all inputs to the Presentation Manager logged by the device driver hooks, presentation manager hooks, and operating system hooks which change the state of the desktop. These inputs include keyboard interrupts, mouse droppings, and application programming interface (API) instructions.

After an input is received, the process proceeds to block 56, which illustrates determining if the history recall function of the present invention was invoked. In a preferred embodiment of the present invention, the history recall function is invoked by pressing a pre-defined function key on keyboard 16; however, those skilled in the art will appreciate that many combinations of inputs, including keystroke sequences, mouse selections, or other inputs, may be utilized to invoke the history recall function of the present invention. If the history recall function was invoked, the process proceeds to block 58, which depicts sending a message to the control process interrupt thread of the present invention depicted in FIG. 5 which is dedicated to recalling previous desktop states. In a preferred embodiment of the present invention, invocation messages are communicated to the interrupt control process depicted in FIG. 5 via a work queue stored in the memory of processing unit 12. The work queue consists of a number of memory locations initialized to a predetermined value. When a user invokes the history recall function of the present invention, one of the entries in the work queue is written with a second value to signify that the history recall function was invoked. As will be described with reference to FIG. 5, the desktop history recall function of the present invention is executed once for each message within the work queue. Although a preferred embodiment of the present invention utilizes a memory queue to communicate between the processes depicted in FIGS. 4 and 5, those skilled in the art will appreciate that a number of known methods of communicating between concurrently executing asynchronous processes may be utilized. Ideally, the work queue may contain an infinite number of entries. However, those skilled in the art will appreciate that the work queue may be limited to a maximum number of entries. Should the number of invocations of the history-recall function exceed the implemented limit, an audible beep or other notification is presented to the user indicating that the maximum number of history recall iterations are pending. From block 58, the process returns to block which has been described.

Returning to block 56, if the input received was not an invocation of the history recall function, the process proceeds to block 60 which determines if the input was a request to terminate the history recall process. If so, the process proceeds to block 62, which illustrates terminating the history recall process and purging all messages from the work queue. Thereafter, the process terminates at block 64.

If the input received was neither an invocation of the history recall function nor a termination request, the process proceeds to block 66, which depicts deleting all entries within ODT 20 which have no dependent ODT entries and which have been marked for deletion by setting a bit within status bits 40. In a preferred embodiment of the present invention, the step illustrated at block 66 is implemented as a subroutine which recursively scans ODT 20 for entries marked for deletion whose associated desktop object is not identified within OD 36 of any other entry as the parent of the entry's associated object.

Next, the process proceeds to block 68, which depicts determining if the input detected at block 54 caused the destroy (i.e., the removal from the desktop) of an object. If not, the process then proceeds to block 70, which determines if the input caused the spawning of an object on the desktop. If the input caused neither the spawning nor the destroy of a desktop object, the process proceeds to block 72, which illustrates inserting an entry into ODT 20. The fields within the inserted entry indicate the unique object identifier of the focused object, that the object dependency is a continuation, and the user or system interaction which generated the new desktop state. For example, block 72 would be performed by the process when a user types a character utilizing keyboard 16 which does not spawn or destroy a desktop object. Thereafter, the process returns to block .54. In an alternative embodiment, block 72 could update an existing entry within ODT 20 if the most recently inserted entry within ODT 20 is marked as a continuation. In this case, block 72 would append the invocation sequence of the current desktop state to that stored within the most recently inserted entry within ODT 20, thereby reducing the storage required for ODT 20. In this alternative embodiment, the history recall process depicted in FIG. 5 would be restructured to process entries storing multiple invocation sequences within a single entry within ODT 20.

Returning to block 70, if the input caused the spawning of a desktop object, the process proceeds to block 74. Block 74 illustrates inserting an entry into ODT 20 specifying the unique object identifier of the spawned object, the object which spawned the current object, and the invocation sequence which spawned the new desktop object. Thereafter, the process returns to block 54.

Returning to block 68, if the input caused the destroy of an object, the process proceeds to block 76, which depicts marking the object and its associated continuation entries for deletion. Next, the process proceeds to block 78, which determines if other entries within ODT 20 depend on the destroyed object. If so, the process returns to block 54 without deleting the destroyed object. The object is not deleted immediately since subsequent invocations of the history recall function may require recalling the destroyed object in order to recall desktop states subsequent to the destruction of the object. If, however, no entries within ODT 20 depend on the destroyed object, the process proceeds to block 80, which illustrates deleting all entries within ODT 20 which are marked for deletion and which have no dependent entries. Thereafter, the process returns to block 54.

Figure 5:
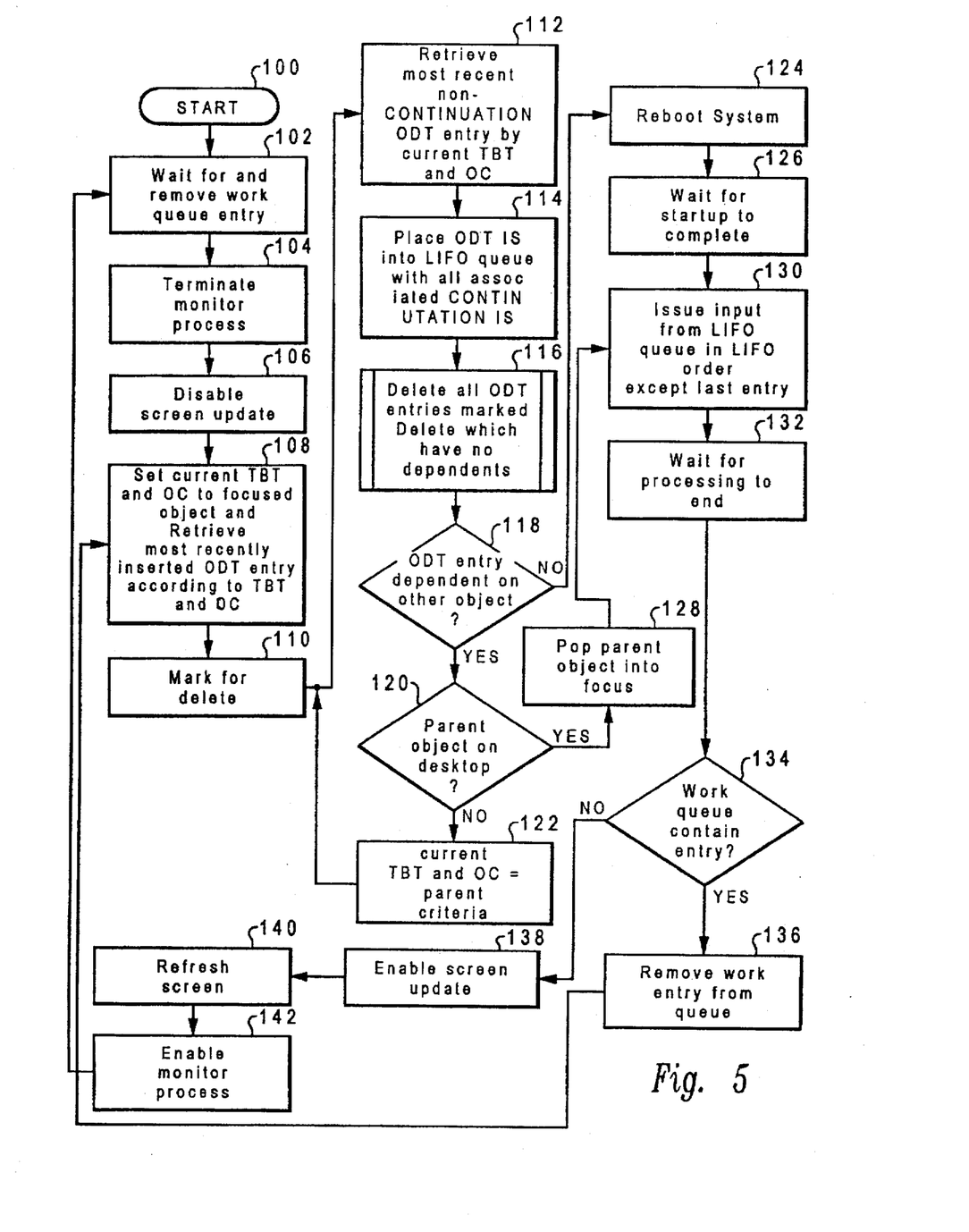
FIG. 5 illustrates a flowchart of the process utilized by the present invention to recall previous desktop states.

With reference now to FIG. 5, there is illustrated a flowchart of the process utilized by the present invention to recall previous desktop states. The process depicted in FIG. 5 comprises an asynchronous thread that may be implemented by suitable software executed within data processing system 10. The process begins at block 100, and thereafter proceeds to block 102, which depicts detecting a message from the monitoring process depicted in FIG. 4 indicating that the history recall function has been invoked. Detection is implied by successfully reading an entry from the work queue. Block 102 remains idle until a work queue entry becomes available. The process then proceeds to block 104, which illustrates terminating the monitoring process illustrated in FIG. 4. The monitoring process of FIG. 4 is suspended until the completion of the process of FIG. 5 since by invoking the history recall function, a user indicates that further manipulations of desktop objects within the current context are not desired. Those skilled in the art will appreciate that the processes depicted in FIGS. 4 and 5 will execute quickly given sufficient hardware and only in unusual circumstances would a user be unable to navigate without undue delay. Next, the process proceeds to block 106, which illustrates disabling the updating of the display. In a preferred embodiment of the present invention in which the process is operating with an OS/2 environment, block 106 is performed by the operating system command "WinenableWindow(DESKTOP,FALSE)" which prevents screen refreshes until the command is repeated. Those skilled in the art will appreciate that in other embodiments of the present invention executing in other operating system environments, the updating of the display may be similarly disabled utilizing other commands.

Thereafter, the process proceeds to block 108, which depicts setting two variables, current TBT and current OC, to the values stored in the most recently inserted ODT entry corresponding to the current desktop state. The process then retrieves from ODT 20 the most recently inserted entry matching the current TBT and current OC values. Next, the process proceeds to block 110, which illustrates marking the most recently inserted ODT entry matching current TBT and current OC for deletion by setting a status bit. The process then proceeds to block 112, which illustrates retrieving from ODT 20 the most recently inserted entry having an object dependency which is not a continuation and which matches the unique object identifier specified by current TBT and current OC. This desktop state is known as an anchor state. The process then proceeds to block 114, which illustrates storing in a last-in, first-out (LIFO) queue the invocation sequence of the anchor state retrieved at block 112 and the invocation sequences of all following entries which have a continuation object dependency upon the retrieved entry. Depending upon the manipulation history of the object associated with the retrieved entry, there may or may not be continuation ODT entries. Thereafter, the process proceeds to block 116, which depicts deleting all entries within ODT 20 which are marked for deletion that have no dependent entries. The function performed at block 116 may be implemented by the same software routine utilized to perform blocks 66 and 80 of FIG. 4.

The process then proceeds to block 118, which determines if the graphical object associated with the ODT entry retrieved at block 112 is dependent upon another object within ODT 20. If not, the retrieved object is the first entry within ODT 20, namely, the desktop. Therefore, the process proceeds to block 124 which illustrates rebooting the system since the desktop is invoked by the keystroke sequence <Ctrl><Alt><Del>. After waiting for startup to complete at block 126, the process proceeds to block 130, which depicts issuing all invocation sequences stored in the LIFO queue, except for the last which is discarded. Thus, the process automatically inputs all commands required to return the desktop to the state immediately previous to the current state. The invocation sequences stored in the LIFO queue are executed in the correct order since ODT 20 is scanned in reverse chronological order and the invocation sequences are executed in LIFO order. In general, a user would not wish to cause block 124 and following processing steps to execute since the same result could be obtained by simply rebooting the system.

The process then proceeds to block 134, which illustrates determining if the work queue contains additional entries. The work queue will contain additional entries if a user invoked the history recall function multiple times by pressing a function key several times in succession, for example. Those skilled in the art will appreciate that the history recall function of the present invention may be implemented so that a user can input a desired recall depth without inputting a keystroke for each desired level of recall. In that case, the recall depth would correspond to the number of iterations performed of the loop composed of blocks 108-132. If additional invocations of the history recall functions are indicated by messages within the work queue, the process removes the current entry from the work queue at block 136, and then returns to block 108 to process the additional work queue entries.

If, however, no entries were present in the work queue at block 134, the process proceeds to block 138. Block 138 depicts enabling screen updates, for example, by sending a message to the operating system. In the preferred embodiment of the present invention in which the process is operating within an OS/2 environment, block 138 is performed by executing the operating system command "WinenableWindow(DESKTOP,TRUE)" which enables screen refreshes. Thereafter, the screen is refreshed at block 140 and the monitoring process illustrated in FIG. 4 is enabled at block 142. Thereafter, the process returns to block 102 to process further invocations of the history recall function.

Returning to block 118, if the ODT entry retrieved at block 112 is dependent upon another desktop object, as is the usual case, the process proceeds to block 120. Block 120 illustrates determining if the parent object (i.e., the graphical object associated with the anchor state) is present on the desktop. If not, the process proceeds to block 122, which illustrates updating current TBT and current OC to the values of the parent of the retrieved ODT entry. The process then returns to block 112. The process repeats blocks 112–122 until the process locates a parent graphical object present on the desktop. The process is guaranteed to find a present parent since the desktop itself is always present. When a present parent is located at block 120, the desired anchor state is found and the process proceeds to block 128. Block 128 illustrates popping the parent object into focus. Thereafter, the process proceeds to block 130 and following blocks which have been described.

As has been described the present invention provides a method and system for recalling previous states of a desktop displayed within the display device of a data processing system. The present invention enables a user to efficiently return to previous states of the desktop without re-performing the desktop object manipulations required to return to the previous state. In addition, since the present invention reexecutes the invocation sequences precedent to the desired context beginning with an anchor state corresponding to an object present on the desktop, all functions available at the desired context are enabled.

While the invention has been particularly shown and described with reference to a preferred embodiment, it will be understood by those skilled in the art that various changes in form and detail may be made therein without departing from the spirit and scope of the invention.

What is claimed is:

1. A method within a data processing system for recalling a previous desktop state, wherein a desktop state comprises a dependence hierarchy and visual arrangement of a plurality of graphical objects representative of operating system functions and data processing applications that are displayed within a display device of said data processing system at a specified time, said method comprising:

detecting each occurrence of a desktop event, which creates a new desktop state;

in response to detecting an occurrence of a desktop event, recording said new desktop state; and in response to a particular input from a user, automatically returning said desktop state to a selected state which occurred prior to a current desktop state by referencing said recorded desktop states, wherein all operating system functions and data processing applications available at said selected state are enabled.

2. The method for recalling a previous desktop state of claim 1, wherein said step of detecting each occurrence of a desktop event comprises:

detecting input from a peripheral device interfaced to said data processing system which creates a new desktop state;

detecting manipulation of said plurality of graphical objects displayed within said display; and detecting invocations of operating system functions and data processing programs.

3. The method for recalling a previous desktop state of claim 1, wherein said step of recording a state of said desktop comprises:

storing within a data structure an entry corresponding to each desktop state, wherein each entry includes:

an object identifier uniquely specifying a focused object among said plurality of graphical objects;

an indicia specifying a parent graphical object among said plurality of graphical objects upon which said focused object depends; and an input sequence that derived said focused object from said parent graphical object.

4. The method for recalling a previous desktop state of claim 3, wherein said step of returning said desktop state to a selected state preceding said current desktop state comprises:

retrieving an input sequence stored as an entry within said data structure corresponding to a latest occurring anchor state whose associated graphical object is present within said current desktop state, wherein an anchor state is a desktop state whose associated focused object has a different object identifier than a graphical object associated with a desktop state immediately preceding said anchor state;

retrieving input sequences stored as entries within said data structure corresponding to desktop states prior to said current state which are dependent upon said anchor state; and executing all of said retrieved input sequences in chronological order.

5. The method for recalling a previous desktop state of claim 4, and further comprising:

disabling refreshes of said display device until said selected desktop state is recalled.

6. The method for recalling a previous desktop state of claim 1, wherein said particular input from a user comprises pressing a function key defined to invoke said step of returning to a previous desktop state.

7. A system within a data processing system for recalling a previous desktop state, wherein a desktop state comprises a dependence hierarchy and visual arrangement of a plurality of graphical objects representative of operating system functions and data processing applications that are displayed within a display device of said data processing system at a specified time, said system comprising:

means for detecting each occurrence of a desktop event which creates a new desktop state;

means, responsive to detecting an occurrence of a desktop event, for recording said new desktop state; and means, responsive to a particular input from a user, for automatically returning said desktop state to a selected state which occurred prior to a current desktop state by referencing said recorded desktop states, wherein all operating system functions and data processing applications available at said selected state are enabled.

8. The system for recalling a previous desktop state of claim 7, wherein said means for detecting each occurrence of a desktop event comprises:

means for detecting input from a peripheral device interfaced to said data processing system which creates a new desktop state;

means for detecting manipulation of said plurality of graphical objects displayed within said display; and means for detecting invocations of operating system functions and data processing programs.

9. The system for recalling a previous desktop state of claim 7, wherein said means for recording a state of said desktop comprises:

means for storing within a data structure an entry corresponding to each desktop state, wherein each entry includes:

an object identifier uniquely specifying a focused object among said plurality of graphical objects;

an indicia specifying a parent graphical object among said plurality of graphical objects upon which said focused object depends; and an input sequence that derived said focused object from said parent graphical object.

10. The system for recalling a previous state of a desktop of claim 9, wherein each entry further comprises a status indicator, wherein said status indicator includes an indication that an associated entry may be deleted from said data structure.

11. The system for recalling a previous desktop state of claim 9, wherein said means for returning said desktop state to a selected state preceding said current desktop state comprises:

means for retrieving an input sequence stored as an entry within said data structure corresponding to a latest occurring anchor state whose associated graphical object is present within said current desktop state, wherein an anchor state is a desktop state whose associated focused object has a different object identifier than a graphical object associated with a desktop state immediately preceding said anchor state;

means for retrieving input sequences stored as entries within said data structure corresponding to desktop states prior to a current state which are dependent upon said anchor state; and means for executing all of said retrieved input sequences in chronological order.

12. The system for recalling a previous desktop state of claim 7, and further comprising:

means for disabling refreshes of said display device until said selected desktop state is recalled.

13. The system for recalling a previous desktop state of claim 7, wherein said particular input from a user comprises an input generated by a user by pressing a particular function key.

* * * * *